(No Model.)
5 Sheets—Sheet 1.
G. W. MORETON.
BORING AND TURNING MILL.
No. 569,344. Patented Oct. 13, 1896.
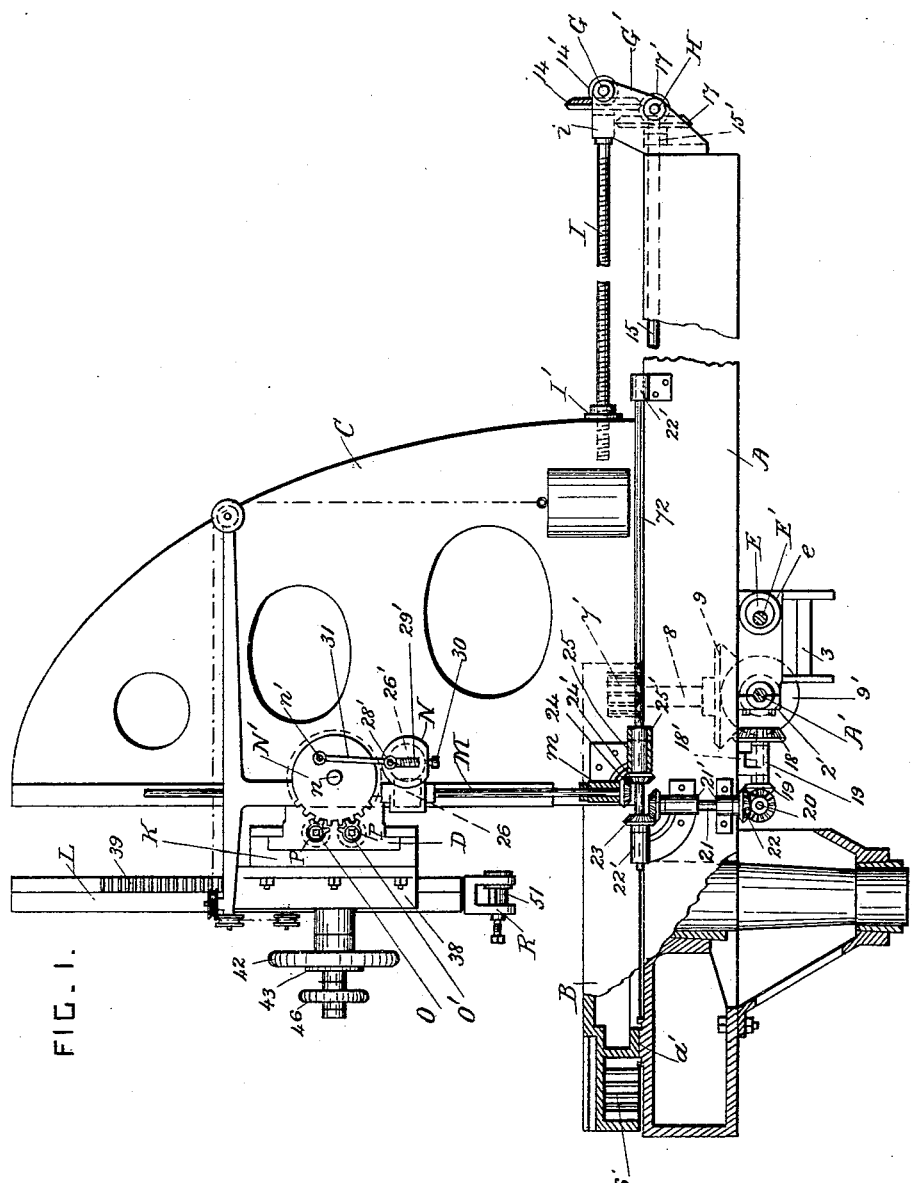
Witnesses
J. Spragg Poole
Walter Allen
Inventor
George W. Moreton
By Attorney
Herbert W. T. Jenner.

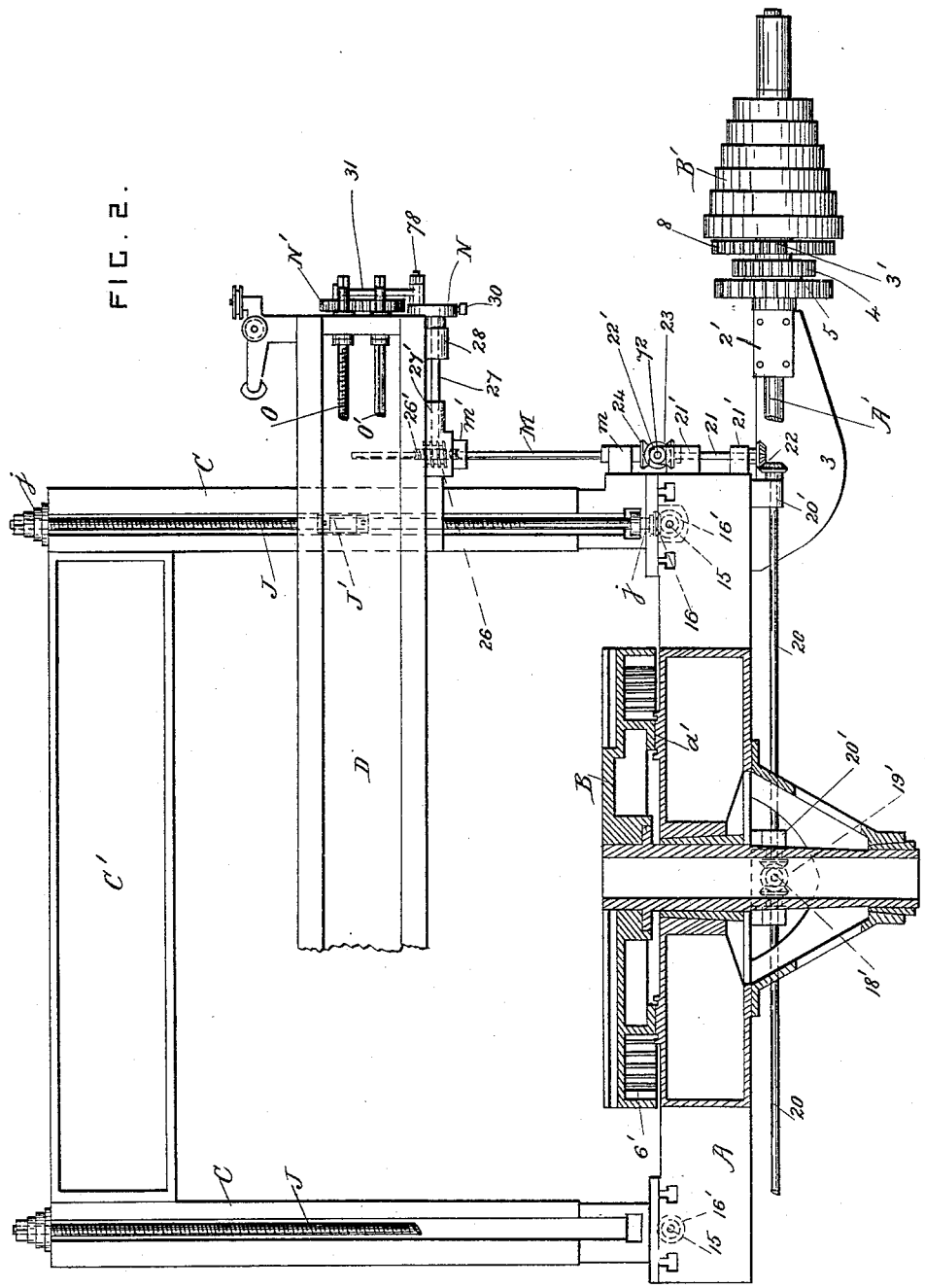

(No Model.) 5 Sheets—Sheet 3.
G. W. MORETON.
BORING AND TURNING MILL.
No. 569,344. Patented Oct. 13, 1896.
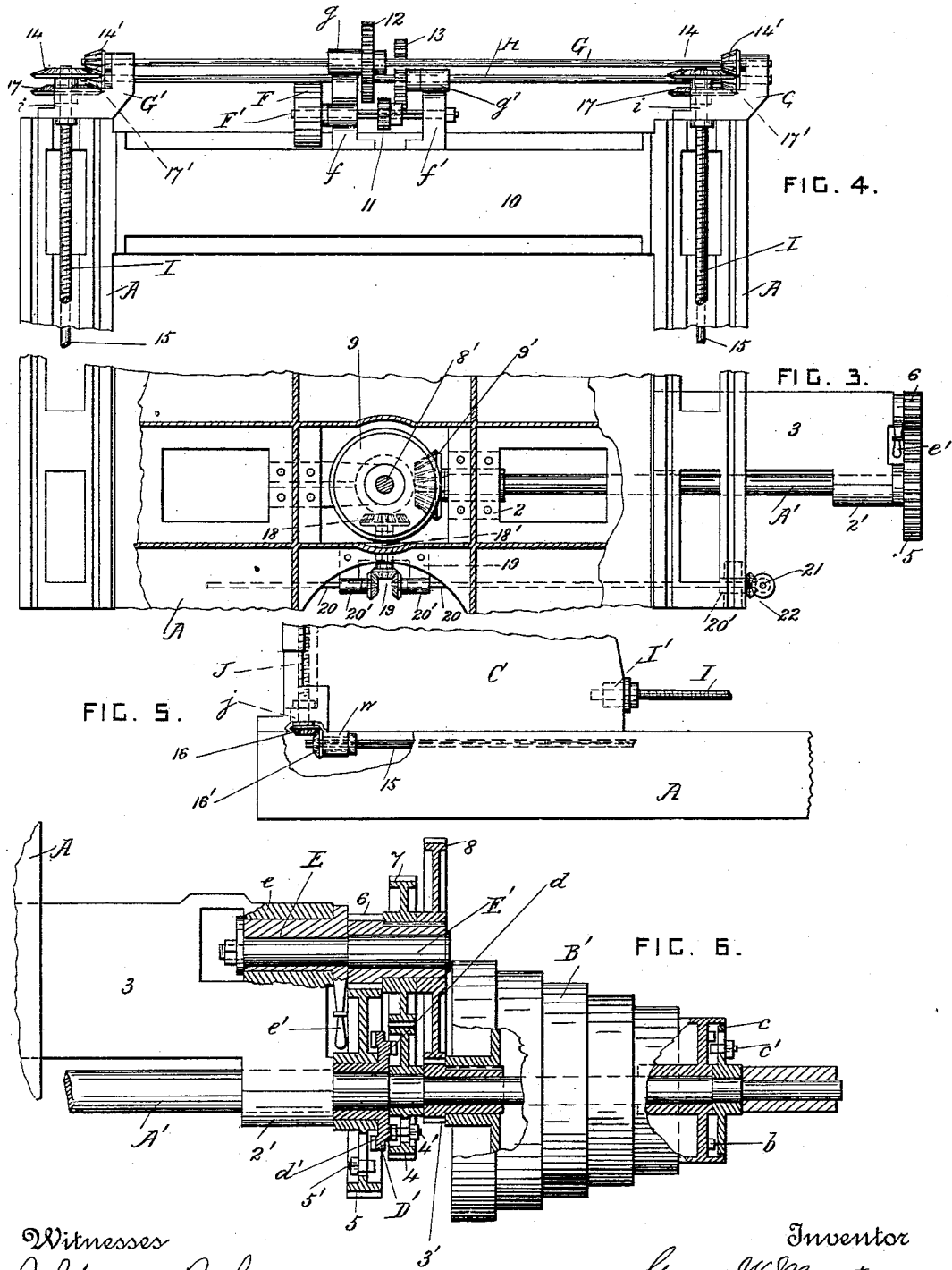

(No Model.) 5 Sheets—Sheet 4.
G. W. MORETON.
BORING AND TURNING MILL.
No. 569,344. Patented Oct. 13, 1896.
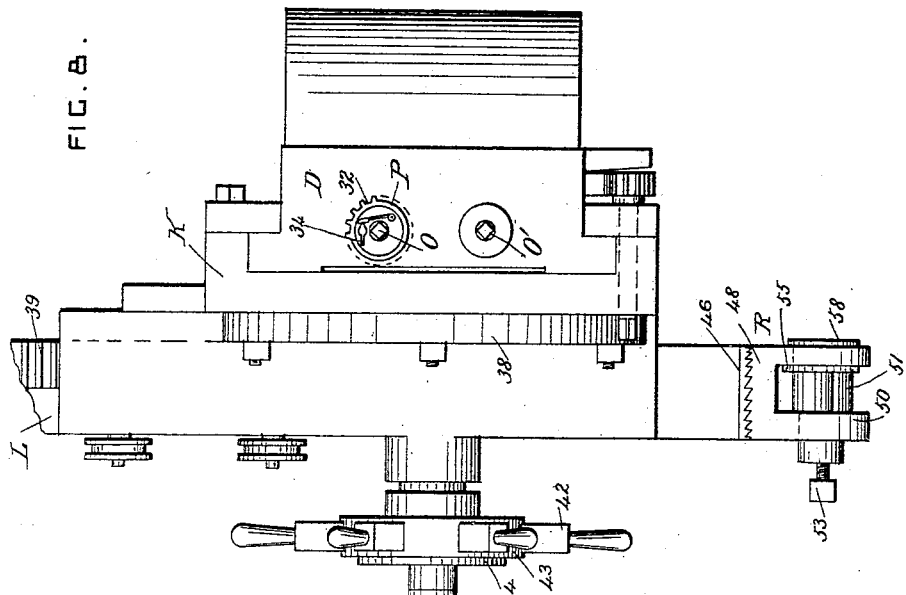
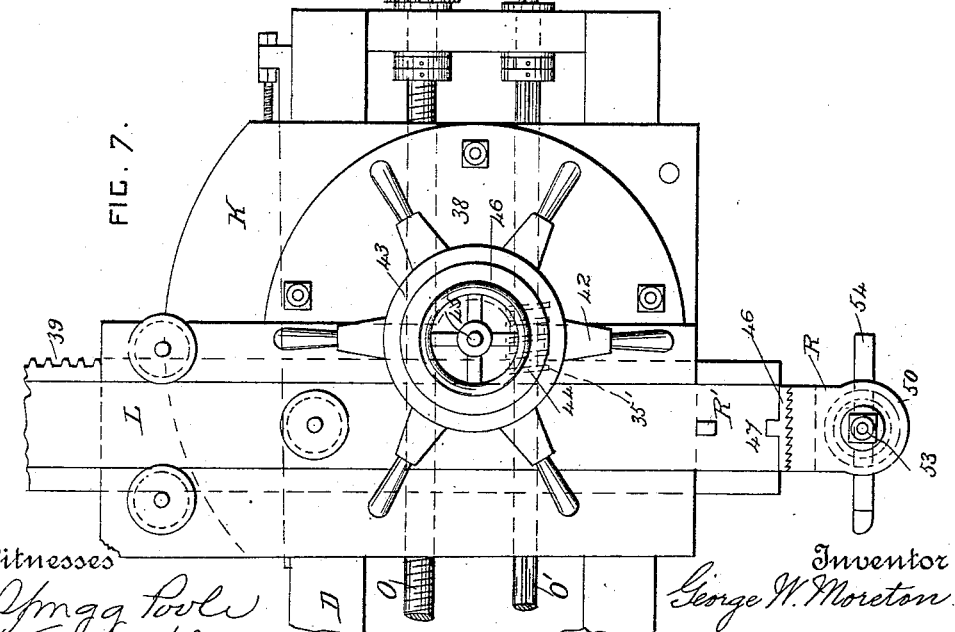
Witnesses
Inventor
George W. Moreton.
By Attorney Herbert W. T. Jenner.

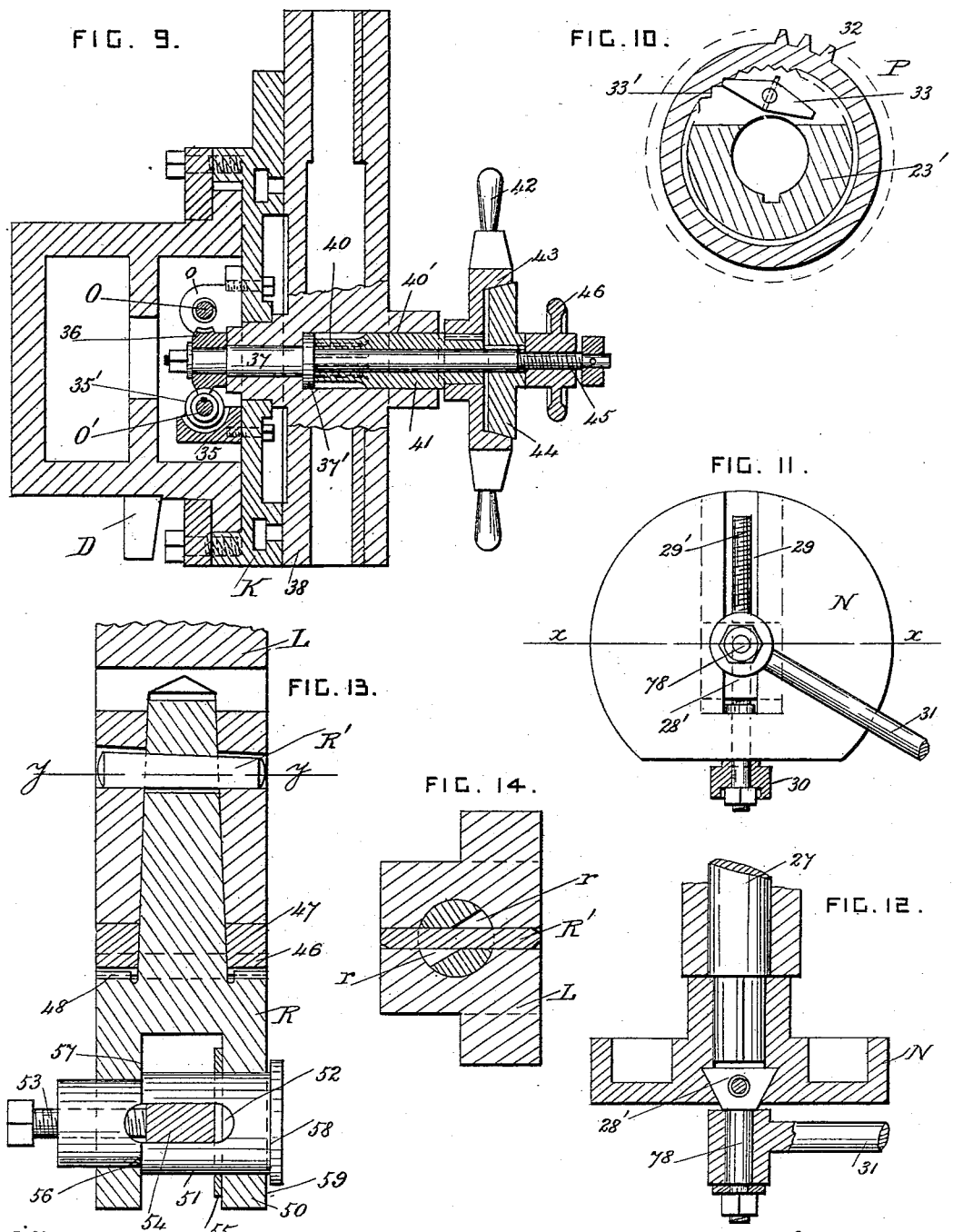

UNITED STATES PATENT OFFICE.

GEORGE WILLIAM MORETON, OF WILMINGTON, DELAWARE, ASSIGNOR TO THE BETTS MACHINE COMPANY, OF SAME PLACE.

BORING AND TURNING MILL.

SPECIFICATION forming part of Letters Patent No. 569,344, dated October 13, 1896.

Application filed June 27, 1896. Serial No. 597,100. (No model.)

*To all whom it may concern:*

Be it known that I, GEORGE WILLIAM MORETON, a citizen of the United States, residing at Wilmington, in the county of New Castle and State of Delaware, have invented certain new and useful Improvements in Boring and Turning Mills; and I do hereby declare the following to be a full, clear, and exact description of the invention, such as will enable others skilled in the art to which it appertains to make and use the same.

This invention relates to boring and turning mills; and it consists in the novel construction and combination of the parts hereinafter fully described and claimed.

In the drawings, Figure 1 is a side view of the mill, partly in section. Fig. 2 is a front view of the same, also partly in section and with a part of the cross-rail and the tool-slides omitted. Fig. 3 is a plan view of the middle part of the bed, partly in section. Fig. 4 is a plan view of the rear end of the bed. Fig. 5 is a side view of the lower part of one of the uprights and a part of the bed, showing the means for sliding the upright and the cross-rail. Fig. 6 is a detail sectional plan view, drawn to a larger scale, showing the mechanism for changing the speed driven by the cone or stepped pulley. Figs. 7, 8, and 9 are respectively a front view, an end view, and a vertical section, of the tool-slide and other parts at one end of the cross-rail. Fig. 10 is a vertical section showing the interior of the click-box. Fig. 11 is a detail front view of the feed-plate. Fig. 12 is a cross-section taken on the line $xx$ in Fig. 11. Fig. 13 is a vertical section through the tool-holder. Fig. 14 is a cross-section taken on the line $yy$ in Fig. 13.

A is the bed of the mill, and B is a horizontally-arranged face-plate revolving on a way $a'$ at the top of the bed.

C are the uprights, having their top portions connected by a distance-piece C'. These uprights are slidable longitudinally on the bed.

D is the cross-rail for carrying the saddles and tool-slides. This cross-rail is slidable vertically on the uprights C.

A' is the main driving-shaft of the mill, journaled in a bearing 2 on the bed and in a bearing 2' of a bracket 3, secured to the bed.

B' is a cone or stepped pulley which is journaled on the outer end of the shaft A' and is provided with lugs $b$ at its smaller end. A single lock-plate $c$ is secured to the shaft A' and is provided with a radial slot and a lock-bolt $c'$, slidable therein. When the lock-bolt is slid into engagement with either of the lugs $b$, the shaft A' is revolved by the cone-pulley. The cone-pulley is revolved by a belt from a countershaft and cone-pulley of approved construction, which are not shown in the drawings. A toothed pinion 3' is secured to the larger end of the cone-pulley.

D' is a double lock-plate secured on the shaft A', and provided with lugs $d$ and $d'$ on opposite sides of it. Two toothed wheels 4 and 5 of different diameters are journaled concentric with the shaft A', one on each side of the lock-plate D', and the larger toothed wheel 5 is preferably journaled on the hub of the lock-plate. The wheels 4 and 5 are provided with radial slots and lock-bolts 4' and 5', slidable therein. These lock-bolts can be slid into engagement with the lugs $d$ and $d'$, respectively.

E is an eccentric journaled in a bearing $e$ in the bracket 3 and provided with a handle $e'$ for operating it.

E' is a pin projecting from the end of the eccentric. Three toothed wheels 6, 7, and 8 are secured together and are journaled on the pin E'. These wheels gear respectively into the wheels 5 and 4 and the pinion 3'.

Three variations of speed are obtainable for each step of the cone-pulley. When the parts are connected as shown in Fig. 6, with the wheel 4 connected to the double lock-plate, the shaft A' is driven by the cone-pulley through the pinion 3' and the wheels 8, 7, and 4 at a certain speed. When the wheel 5 is connected to the double lock-plate instead of the wheel 4, the shaft is driven through the pinion 3' and the wheels 8, 6, and 5 at a different speed. A third speed is obtainable by releasing both wheels 4 and 5 from the double lock-plate and connecting the single lock-plate $c$ direct to the cone-pulley. When this is done, the wheels 6, 7, and 8 are preferably thrown out of gear with the wheels 5 and 4 and the pinion 3'. This is accomplished by raising the handle e' and turning the eccentric and its pin away from the shaft A'.

The face-plate B is revolved from the shaft A' and is provided with an internal circular rack 6'. A toothed pinion 7' gears into this rack and is secured on the upper end of a vertical shaft 8', journaled in the bed. A beveled toothed wheel 9 is secured on the lower end of the shaft 8' and is driven by a beveled toothed pinion 9', secured on the shaft A'. The cross-rail is slid vertically along uprights and the uprights are slid back and forth longitudinally of the bed by driving mechanism which is wholly independent of the mechanism for revolving the face-plate.

F is a driving-pulley secured on a shaft F', which is journaled in brackets f and f', secured to the distance-piece 10, which forms the rear end of the bed A. A slidable toothed pinion 11 is splined on the shaft F' between the brackets f and f'.

G is a transverse shaft journaled in the brackets G', secured to the end of the bed, and also journaled in the bearing g on the bracket f.

H is a second transverse shaft journaled in the brackets G' and in the bearing g' of the bracket f'.

A toothed wheel 12 is secured on the shaft G and a toothed wheel 13 is secured on the shaft H. The pinion 11 may be slid into gear with either of the wheels 12 or 13, or it may be placed in an intermediate position, so that neither of the shafts G or H is revolved. The screws I for sliding the uprights are operated from the shaft G. Two screws I are used, one for each upright, and each screw is connected with its respective end of the shaft G in a similar manner. A nut I' is secured in the rear part of each upright for the screw I to engage with. The rear end of the screw I is journaled in a bearing i on the bracket G'. A beveled toothed wheel 14 is secured on the end of the screw I and gears into a beveled toothed pinion 14', secured on the shaft G. When the pinion 11 is slid into gear with the wheel 12, the uprights are slid longitudinally by means of the shaft G, the beveled pinions 14' and wheels 14, and the screws I.

The cross-rail D is guided on the ways at the front of the uprights in any approved manner. The screws J for sliding the cross-rail are operated from the shaft H. Two similar screws are used, and each screw is connected with its respective end of the shaft H in a similar manner. A nut J' is secured to the cross-rail for the screw J to engage with, and the screw is journaled in bearings j on the upright. A horizontal shaft 15 is journaled in a bearing-bracket w on the upright, as shown in Fig. 5, and in a bearing 15' on the bracket G, as shown in Fig. 1. The front end of the shaft 15 is connected to the lower end of the screw J by miter gear-wheels 16 and 16'. The wheel 16 is secured to the screw J, and the hub of the wheel 16' is journaled in the bracket w and is splined to the shaft 15. The rear end of the shaft 15 has a beveled toothed wheel 17 secured upon it, which gears into a beveled toothed pinion 17', secured on the shaft H. When the pinion 11 is slid into gear with the wheel 13, the cross-rail is slid vertically by means of the shaft H, the beveled toothed pinions 17' and 17, the shafts 15, the miter gear-wheels 16 and 16', and the screws J. The cross-rail carries two similar saddles K and tool-slides L, and each saddle and tool-slide is operated from that side of the mill to which it pertains by similar driving mechanism.

A beveled toothed wheel 18 (shown in Figs. 1 and 3) gears into the beveled toothed wheel 9 on the shaft 8' and is secured on the horizontal shaft 18', journaled in a bracket 19, secured to the under side of the bed. Similar horizontal shafts 20 are journaled in bearings 20' and are arranged crosswise of the bed. Miter gear-wheels 19' are secured on the ends of the shafts 20 and 18', so that the shafts 20 are driven from the shaft 18'. A vertical shaft 21 is journaled in bearings 21' at the side of the bed, and 22 are miter gear-wheels connecting the shaft 20 with the lower end of the shaft 21. A horizontal shaft 72 is journaled in bearings 22', secured to the side of the bed, and 23 are miter gear-wheels connecting the upper end of the shaft 21 with the front end of the shaft 72.

M is a vertical shaft journaled in the bearing m, secured to the upright, and in the bearing m', secured to the cross-rail. A beveled toothed pinion 24 is secured on the lower end of the shaft M and gears into a similar beveled toothed pinion 24', splined on the shaft 72. The hub of the pinion 24' is journaled concentric with the shaft 72 in a bracket 25, secured to the upright, and is provided with a collar 25' to prevent it from slipping longitudinally.

A worm 26 is splined on the vertical shaft M and gears into a worm-wheel 26'. The worm-wheel 26' is secured on a horizontal shaft 27, which is journaled in brackets 27' and 28, carried by the cross-rail. The bracket 27' also operates to slide the worm 26 longitudinally on the shaft M.

N is a feed-plate secured on the outer end of the shaft 27, and is shown in detail in Figs. 11 and 12. The ratio of the gearing is preferably arranged so that the feed-plate makes two revolutions to every revolution of the face-plate, but the ratio of their revolutions may be otherwise arranged.

N' is a toothed wheel mounted on a pin n, carried by the bracket 28, and it is provided with a crank-pin n'. The feed-plate N is provided with a crank-pin 78, which projects from a dovetailed block 28'. This block is slidable in a radial slot 29, which extends across the center or axis of the feed-plate, and 29' is a screw journaled in the feed-plate and engaging with the said block. The end of the screw 29' is provided with a knob 30 for revolving it, and thereby varying the amount of the feed by sliding the block in the slot. A connecting-rod 31 is pivoted to the crank-pins n' and 78 and oscillates the toothed wheel more or less, according to the position of the block 28'.

O is the traverse-screw, journaled longitudinally of the cross-rail, and O' is the feed-shaft for the tool-slide, also journaled longitudinally of the cross-rail. The screw O and the shaft O' are each provided with a square end for receiving a handle for the purpose of giving them a quick motion to adjust the tool to the work.

The oscillations of the toothed wheel N' are caused to revolve the screw O and the shaft O' by means of similar click-boxes P, slid on the splined projecting ends of the screw and shaft, as shown in Figs. 1, 7, and 8.

The click-box may be of any approved construction, such as shown in Fig. 10. The periphery of the click-box is provided with teeth 32, which gear into the teeth of the wheel N'. The hub 23' of the click-box is journaled in its periphery and carries a double pawl or click 33, which engages with the notches 33' inside the click-box. A spring-pressed lever 34 is secured on the pawl-shaft outside the click-box and may be turned to cause the pawl to revolve the hub of the click-box in either direction or to place the pawl in an intermediate position, so that no motion is communicated to it.

The traverse-screw O engages with a nut o on the back of the saddle, as shown in Fig. 9, and slides the saddle K upon the cross-rail.

The saddle K has a bracket 35 secured to its rear, which carries a worm 35'. This worm is splined on the shaft O' and gears into a worm-wheel 36, which is secured on the central shaft 37 of the swiveled bracket 38, which is supported by the saddle in any approved manner. The tool-slide L is slidable in the swiveled bracket 38 between guides of any approved construction, and it is provided with a toothed rack 39 on one of its sides. Both tool-slides are balanced in their guides by means of counterweights attached to chains, which pass over guide-pulleys and are attached to the tool-slides in any approved manner. The central shaft 37 has a collar 37', which prevents it from sliding longitudinally. A toothed pinion 40 is formed on the end of a sleeve 41, which is journaled on the front part of the shaft 37 and in a recess 40', formed in the said swiveled bracket. The pinion 40 gears into the toothed rack 39, and a handle-wheel 42 is secured on the projecting end of the sleeve 41 for moving the tool-slide rapidly whenever desired. The swiveled bracket may be turned in either direction, so that the tool-slide can be moved vertically or at any angle.

The handle-wheel 42 is provided with an outer friction-clutch member 43, and 44 is an inner friction-clutch member splined on the central shaft 37. The shaft 37 has a screw-threaded end 45, and 46 is a hand-nut screwed thereon and operating to press the two friction-clutch members into operative connection with each other. When the friction-clutch members are connected, the tool-slide is operated by means of the shaft O', worm 35', worm-wheel 36, central shaft 37, sleeve 41, and pinion 40. The lower end of the tool-slide is provided with means for adjusting the cutting-tool.

R is the tool-holder, provided with a tapering shank, which is revoluble to a limited extent within a socket in the lower end of the tool-slide. R' is a tapered key for drawing up the shank tightly in the socket. Slots r are cut in the shank on opposite sides of the keyway, so as to permit the shank to be turned around about forty-five degrees when the key is slack in the keyway.

The bottom of the tool-slide is provided with a toothed plate 46, having projections 47, which engage with grooves in the tool-slide.

The tool-holder is provided with a toothed shoulder 48, which engages with the toothed plate 46. When the key R' is removed or slackened sufficiently to separate the teeth on the said shoulder and plate, the tool-holder can be revolved to adjust the tool in a horizontal plane. The teeth are preferably ratchet-shaped, and are arranged so that the pressure is between their vertical surfaces, so that there is no tendency to slip.

The tool-holder has a forked lower end 50, and 51 is the tool-post, journaled horizontally in the said forked end. The tool-post has a slot 52 and a set-screw 53 for holding a cutting-tool 54 in the said slot against the washer 55 on the inside of the forked end.

The tool-post has a shoulder 56, which bears against the inside surface 57 of the forked end, and a second shoulder 58, which is normally clear of the outer surface 59 of the forked end. The shoulder 58 is at a very short distance from the surface 59, and the parts are so proportioned that when the set-screw is tightened up to clamp the tool in any desired position the forked end of the tool-holder is sprung open to substantially its elastic limit when the shoulder 58 bears on the surface 59. The shoulder 58 prevents the forked end from being strained beyond its elastic limit and the tool-post and tool-holder form a very stiff and rigid support for the tool.

What I claim is—

1. The combination, with a driving-shaft, and a double lock-plate secured thereon; of two toothed wheels journaled one on each side of the lock-plate, each wheel being provided with means for connecting it to the lock-plate; a driving-pulley and a toothed pinion secured together and journaled on the said shaft, a pin supported parallel with the said shaft, and three toothed wheels of different diameters secured together side by side and gearing into the said wheels and pinion on the driving-shaft, substantially as set forth.

2. The combination, with a driving-shaft, and a double lock-plate secured thereon; of two toothed wheels journaled one on each side of the lock-plate, each wheel being provided with means for connecting it to the lock-plate; a driving-pulley and a toothed pinion secured together and journaled on the said shaft, a single lock-plate secured on the said shaft and provided with means for connecting it to the said driving-pulley, a pin supported parallel with the said shaft, and three toothed wheels of different diameters secured together and gearing into the said wheels and pinion on the driving-shaft, substantially as set forth.

3. The combination, with a driving-shaft, and a double lock-plate secured thereon; of two toothed wheels journaled one on each side of the lock-plate, each wheel being provided with means for connecting it to the lock-plate; a driving-pulley and a toothed pinion secured together and journaled on the said shaft, a single lock-plate secured on the said shaft and provided with means for connecting it to the said driving-pulley, a supporting-bracket, an eccentric journaled in the said bracket and provided with a pin arranged parallel with the said shaft, three toothed wheels of different diameters secured together and journaled on the said pin, and means for turning the said eccentric and thereby throwing the said three wheels into or out of gear with the said wheels and pinion on the driving-shaft, substantially as set forth.

4. The combination, with a bed, uprights slidable longitudinally thereon, and a cross-rail slidable vertically on the said uprights; of a driving-shaft provided with a driving-pulley and journaled at the rear of the bed, two shafts extending across the bed at its rear, disengageable driving mechanism connecting the two said shafts with the said driving-shaft, vertical screws engaging with the cross-rail, horizontal screws engaging with the uprights, and intermediate driving devices connecting the said vertical and horizontal screws respectively with the two said shafts at the rear of the bed, substantially as set forth.

5. The combination, with a bed, a horizontally-arranged face-plate supported by the bed, a main driving-shaft provided with means for revolving it, said means being arranged at one side of the bed, and intermediate driving mechanism connecting the said shaft and face-plate; of two uprights slidable longitudinally on the bed, a cross-rail, a saddle and a tool-slide, all carried by the said uprights; an auxiliary driving-shaft extending across the bed at its rear and provided with means for revolving it separate from the said means for revolving the face-plate, horizontal screws engaging with the said uprights, and toothed wheels connecting the said screws with the said auxiliary driving-shaft, substantially as set forth.

6. The combination, with a bed, a horizontally-arranged face-plate supported by the bed, a main driving-shaft provided with means for revolving it, said means being arranged at one side of the bed, and intermediate driving mechanism connecting the said shaft and face-plate; of two uprights slidable longitudinally on the bed; a vertically-slidable cross-rail, a saddle and a tool-slide, all carried by the said uprights; an auxiliary driving shaft extending across the bed at its rear and provided with means for revolving it separate from the said means for revolving the face-plate, vertical screws engaging with the said cross-rail, and intermediate driving mechanism operatively connecting the lower ends of the said screws with the said auxiliary driving-shaft, substantially as set forth.

7. The combination, with a bed, uprights slidable longitudinally thereon, and a cross-rail slidable vertically on the said uprights; of a shaft H extending across the bed at its rear and provided with means for revolving it, horizontal shafts 15 extending longitudinally of the bed, beveled toothed wheels connecting the shafts H and 15, vertical screws engaging with the cross-rail and having beveled toothed wheels 16 secured on their lower ends, and beveled toothed wheels splined on the shafts 15 and engaging with the said wheels 16, substantially as set forth.

8. The combination, with a swiveled bracket, and a tool-slide carried thereby and provided with a toothed rack; of a central shaft journaled in the said bracket and provided with means for revolving it and a collar preventing it from sliding longitudinally, a sleeve journaled in a recess in the said bracket and on the said central shaft and provided with a toothed pinion gearing into the said rack, a hand-wheel secured on the projecting end of the said sleeve and provided with a friction-clutch member, a friction-clutch member splined on the projecting front end of the said central shaft, and a nut screwed on the front end of the said central shaft, substantially as set forth.

9. The combination, with a tool-slide; of a tool-holder provided with a shank revoluble in a socket in the tool-slide, said tool-slide and tool-holder being provided with intergearing teeth, and with keyways, the keyway in the shank having lateral slots permitting the tool-holder to be secured in various positions; and a key in the said keyways, substantially as set forth.

10. The combination, with a non-revoluble tool-slide having a series of teeth on its lower end; of a tool-holder provided with a toothed shoulder engaging with the said teeth, and a shank revoluble in a socket in the tool-slide; a tool-post carried by the said tool-holder; and means for securing the said shank in the socket, substantially as set forth.

11. The combination, with a tool-holder provided with a forked end; of a tool-post carried by the said forked end and provided with a slot for the tool, and two shoulders, one of the said shoulders being normally clear of the forked end when the other shoulder is bearing against it; and a screw operating to clamp the tool in the tool-holder and to cause both shoulders to bear upon the tool-holder before the elastic limit of the said forked end is exceeded, substantially as set forth.

In testimony whereof I affix my signature in presence of two witnesses.

GEORGE WILLIAM MORETON.

Witnesses:
JOHN C. PECK,
JOHN W. PEREGOY.